United States Patent [19]
Hastwell

[11] 3,902,517
[45] Sept. 2, 1975

[54] PUMP AND VALVE ASSEMBLY FOR PRESSURIZING FUEL TANKS FOR PORTABLE STOVES, LANTERNS AND THE LIKE

[76] Inventor: Richard Hastwell, R.D. 3, Lovers Ln., Steubenville, Ohio 43952

[22] Filed: Nov. 27, 1973

[21] Appl. No.: 419,243

[52] U.S. Cl. ................ 137/209; 137/223; 431/344
[51] Int. Cl. ............................................. F23d 13/04
[58] Field of Search ............... 137/209, 223, 525.1; 222/401, 394; 46/90; 431/344

[56] References Cited
UNITED STATES PATENTS

| | | | |
|---|---|---|---|
| 2,307,616 | 1/1943 | Booth | 222/401 X |
| 2,400,955 | 5/1946 | Samel | 137/223 X |
| 2,605,784 | 8/1952 | Snider | 137/525.1 |
| 3,243,085 | 3/1966 | Wilson | 137/209 X |

*Primary Examiner*—Alan Cohan
*Attorney, Agent, or Firm*—Clarence A. O'Brien; Harvey B. Jacobson

[57] ABSTRACT

A valve of resilient material incorporated into a filler cap of a fuel tank for a portable camping stove, lantern or the like constructed to detachably receive an inflating needle connected with an elongated flexible hose having a pump engaged with the other end thereof. The filler cap is employed in the usual manner to replenish the fuel supply and when it is desired to pressurize the fuel tank, it is only necessary to force the inflating needle into a normally closed passageway in the resilient body which forms the valve.

5 Claims, 4 Drawing Figures

PATENTED SEP 2 1975  3,902,517

PUMP AND VALVE ASSEMBLY FOR PRESSURIZING FUEL TANKS FOR PORTABLE STOVES, LANTERNS AND THE LIKE

BACKGROUND OF THE INVENTION

1. Field of the Invention

The present invention generally relates to a pump and valve assembly associated with a fuel tank in order to pressurize the tank with the device being particularly useful in combination with portable camping stoves, portable camping lanterns and similar devices which employ a burner assembly supplied with fuel from a pressurized tank.

2. Description of the Prior Art

Many devices are available commercially which utilize a pressurized tank of liquid fuel for supplying such fuel to a burner for heating, cooking, illumination and the like. Typical of such devices are portable camping stoves, lanterns and the like. One example of such a stove is illustrated in U.S. Pat. No. 3,117,568, issued Jan. 14, 1964 to Harold Hoenisch. As illustrated in this patent, the fuel tank is attached fixedly along the front of the stove with the tank including a filler cap in order to pour liquid fuel into the tank and a manually operated reciprocating piston type of pump built into and rigid with the tank for pressurizing the same. Portable lanterns conventionally employ a tank which also forms a supporting base for the lantern with the filler cap and pump usually being oriented on opposite sides of a cylindrical fuel tank. One of the problems which arises when using stoves or lanterns of the conventional type is the difficulty encountered in pressurizing the tank. Frequently, when cooking on such a stove, it is necessary to pressurize the tank while pans or other containers are on the stove with the pan handles normally being disposed in overlying relation to the tank. Under such circumstances, operation of the pump by reciprocating the pump handle frequently results in the handles of the containers being struck thus causing the container to be upset and in some cases cause burns. Other problems which occur result from the reciprocation of the pump handle causing the entire stove to move on its supporting surface. Lanterns using this type of pump are frequently hung from an overhead support such as a tent pole, frame or the like, and it is necessary to remove the lantern from its support and place it in a convenient location in order to effectively operate the pump, even if the pump is at a convenient position, such as setting on a table or the like, movement of the pump handle frequently causes movement of and agitation of the lantern. Also, the inclusion of a pump in each stove, lantern or the like materially increases the cost of the item.

SUMMARY OF THE INVENTION

The present invention has for one of its objects, the provision of a valve assembly incorporated into the filler cap of a pressurized fuel tank employed with a portable camping stove, lantern or the like which enables a conventional inflating needle to be inserted through the valve assembly with the inner end thereof in communication with the interior of the tank and the outer end connected with an elongated flexible tube, hose or the like which, in turn, has its other end connected with a suitable pump. This enables air to be pumped into the tank through a flexible hose so that any movement imparted to the pump during the pumping operation will not be imparted to the tank and its associated stove, lantern and the like. In addition, the elongated tube or hose enables the pump to be remotely located in relation to the tank. For example, if a lantern is supported from an overhead support, the person operating the pump may stand at ground level with the tube extending from a hand held pump to the inflating needle inserted through the valve assembly in the filler cap on the fuel tank of the lantern.

Another object of the present invention is to provide a valve assembly in accordance with the preceding object in which the valve assembly includes a resilient body received in the filler cap and filler neck in the fuel tank and forming a seal between the cap and neck with the resilient body including a normally closed passageway which enables insertion of and removal of an inflating needle while maintaining a seal around the needle while it is in place and sealing the passageway due to the inherent resiliency of the body and due to pressure in the tank when the needle is removed.

A further object of the invention is to provide a pump and valve assembly in accordance with the preceding objects which is relatively simple in construction, easy to install, enables the use of a remote pump thereby eliminating the necessity of each tank being provided with a pump that is built into the tank, and which provides the capability of the tank being pressurized at anytime during operation of the lantern, stove or the like without creating dangerous situations.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
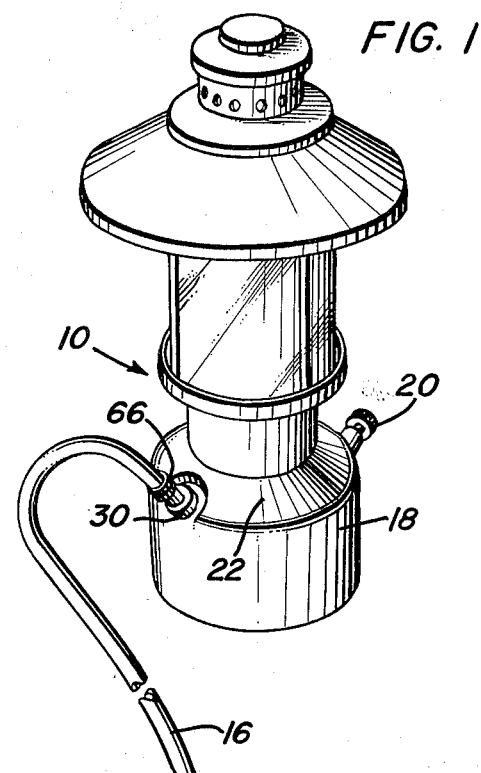
FIG. 1 is a perspective view of a lantern illustrating the pump and valve assembly of the present invention associated with the fuel tank forming the bottom thereof.

Referring now specifically to the drawings, the reference numeral 10 generally designates a conventional portable lantern that is a commercially available item. It is pointed out that the lantern has been included for illustrative purposes inasmuch as the present invention may also be utilized with portable camping stoves or any other similar portable equipment having a liquid fuel receiving tank which is pressurized during use.

The pump and valve assembly of the present invention includes a pump 12, a valve assembly 14 and an elongated flexible tube or hose 16 interconnecting the pump 12 and valve assembly 14 thus enabling the pump 12 to be located remotely from the valve assembly 14.

As illustrated, the lantern 10 includes a generally cylindrical tank 18 having a permanently affixed pump 20 which is normally provided on such devices. The tank 18 includes an inwardly inclined upper wall portion 22 and receives a quantity of liquid fuel 24. Also, the tank 18 is provided with a filler neck 26 which defines an opening 28 by which liquid fuel 24 may be placed into the tank in a well known manner. The filler neck 26 is externally threaded to receive an internally threaded filler cap 30 provided with a knurled external surface 32 to facilitate application of and removal of the filler cap 30 which must be securely positioned on the filler neck 26 in a sealed manner so that the pressure in the tank 18 will not leak. All the aforementioned structure is conventional in existing lanterns, stoves and the like.

Figure 2:
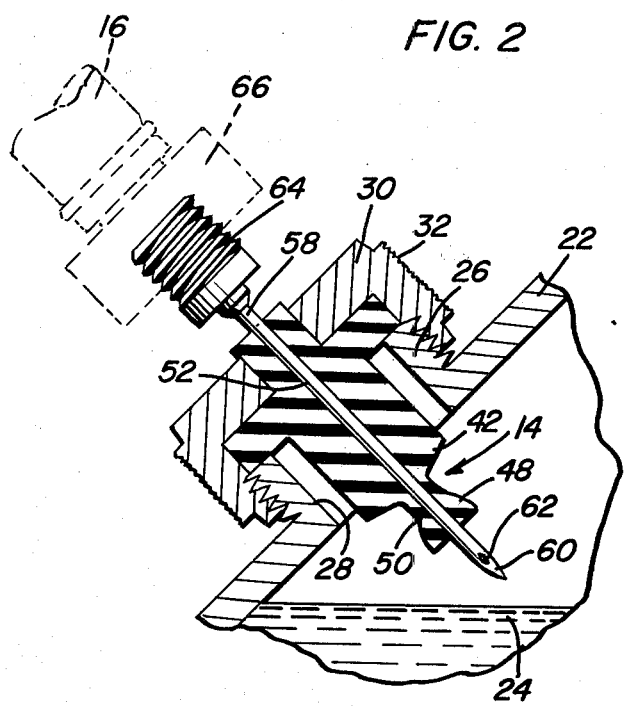
FIG. 2 is a detailed sectional view, on an enlarged scale, illustrating the valve assembly associated with the filler cap and an inflating needle inserted into its position of use.
Figure 3:
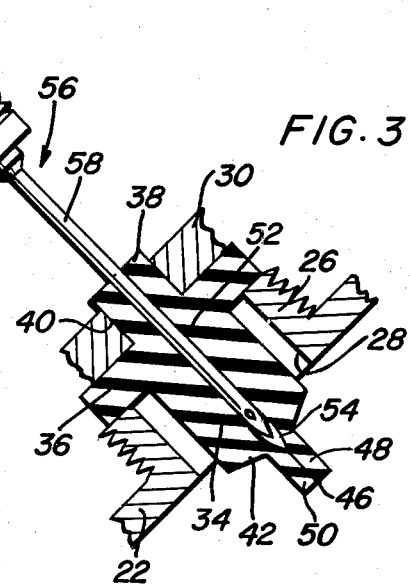
FIG. 3 is a sectional view similar to FIG. 2 but illustrating the closing and sealing of the passageway through the valve body when the inflating needle is withdrawn.
Figure 4:
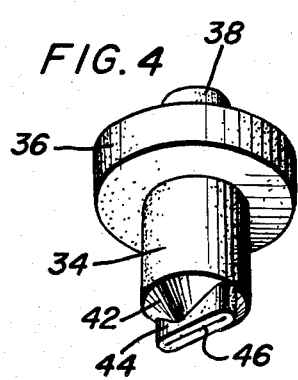
FIG. 4 is a perspective view of the valve body per se.

The valve assembly 14 includes a generally cylindrical valve body 34 constructed of resilient material such as molded rubber, neoprene, plastic or the like. The upper end of the cylindrical body 34 is provided with a cylindrical flange 36 which is received in the cylindrical interior of the filler cap 30 as illustrated in FIG. 2 with the bottom surface of the flange engaging the end of the filler neck 26 and the upper surface of the flange engaging the bottom surface of the filler cap 30 thus forming a seal or gasket between the filler cap 30 and the filler neck 26. Projecting axially from the flange 36 is a cylindrical extension 38 of lesser diameter than the flange 36 and of lesser diameter than the cylindrical body 34. The cylindrical extension 38 extends through and is closely received in an aperture 40 formed centrally in the plate portion of the filler cap 30 with the outer end of the cylindrical extension 38 projecting slightly outwardly beyond the outer surface of the filler cap 30 as illustrated in FIGS. 2 and 3. The bottom or inner end of the cylindrical body 34 tapers sharply inwardly as at 42 and is provided with a relatively thin and more flexible oval shaped extension 44 having a transversely extending entrance slit 46 formed therein so that the extension 44, in effect, forms two relatively pliable or flexible flaps 48 and 50 separate from each other thus defining the slit 46 with the end edges of the flaps 48 and 50 being integrally connected with the flaps also being integral with the body 34 to form the extension 44. The body 34 includes a longitudinal passageway formed therein and designated by numeral 52 which is relatively small in diameter and which extends from an inner terminal end portion 54 to the outer end of the extension 38 with the terminal inner end 54 being disposed adjacent the area of connection between the flaps 48 and 50, and the body 34 with the slit 46 forming a continuation of the passageway 52.

An inflating needle generally designated by numeral 56 is inserted through the valve assembly 14 with the needle 56 being conventional in construction and including a small needle-like shank 58 which is hollow and provided with a rounded terminal end 60 and a discharge opening 62 adjacent thereto. The upper end of the shank 58 is provided with an externally threaded fitting 64 rigid therewith with the fitting 64 screw threadedly receiving a rotatable connector 66 on the end of the hose or tube 16. The inflating needle 56 is the type employed for inflating footballs, basketballs or other inflatable balls and the threaded connector 56 is that type normally provided on various types of hand-operated pump hoses and the like, and is connected to the tube or hose 16 in a conventional manner. The other end of the tube or hose 16 is connected to the pump 12 which is also of conventional construction and includes a cylinder 58 and a handle 70 connected with a piston rod 72 in order to manually operate a reciprocating piston within the cylinder 68. A connector 74 is provided for connecting the hose or tube 16 to the pump cylinder 68 in a conventional manner. Also, the pump 12 may be provided with a check valve or the tube or hose may be provided with a check valve to make certain that no return flow of fuel occurs into the hose or tube. While a piston and cylinder pump has been illustrated with the cylinder being hand-held, it is pointed out that other types of pumps may be employed such as a conventional squeeze bulb type pump, a foot-operated type pump or a combined hand-operated and foot stabilized pump such as a conventional tire pump with the only necessary factor being the capability of providing pressurized air to the tank through the elongated flexible tube or hose thus enabling the pump to be oriented remote from and isolated from the tank insofar as imparting any movement to the tank in the event of movement of the pump which normally occurs during operation thereof.

With this assembly, the inflating needle along with its associated flexible tube and pump may be quickly and easily connected with the tank by inserting the needle into the valve body so that the inner discharge end of the needle will project into the interior of the tank. When the tank has been pressurized to the desired degree, it is only necessary to pull the inflating needle out of the valve body with the passageway through the valve body then self-sealing itself. The valve body is readily assembled with the filler cap and in no way affects connection of the filler cap with the filler neck on the tank. The filler cap may be provided with the central hole receiving the extension 38 and in some instances, the filler cap is already provided with a hole or socket in the central area thereof. Thus, the present invention may be incorporated into existing equipment with very little modification and at very reasonable cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a pressurized liquid fuel receiving tank having a filler neck, a filler cap forming a closure for the neck, pump means remote from the filler cap, a flexible hose extending from the pump means to the filler cap, said flexible hose including an inflating needle on the end thereof, said filler cap including a valve body of resilient material having a passageway therethrough receiving the inflating needle to communicate the pump means with the interior of the tank when the inflating needle is inserted through the valve body with the passageway in the valve body being self-sealing when the inflating needle is withdrawn thereby enabling the tank to be pressurized by the remote pump means without the tank being moved due to forces exerted thereon when operating the pump means, said valve body extending into the filler neck and including a flange received in the filler cap and forming a seal between the filler cap and filler neck, the inner end of said body including axially extending flaps projecting therefrom and defining an entrance slit therebetween with the entrance slit being normally closed and penetrable by the inflating needle to define a portion of the passageway so that when the inflating needle is forced through the valve body, it will extend through the slit and communicate with the interior of the tank, said valve body including an axial extension of cylindrical configuration on the end thereof remote from the flaps, said filler cap including a hole therethrough receiving said extension, said valve body, flaps, flange and extension being of unitary construction with the major portion of the passageway being of the same shape and configuration as the inflating needle and sealingly and frictionally receiving the same when inserted therethrough.

2. The structure as defined in claim 1 wherein said fuel tank is incorporated into a portable article having a burner assembly associated therewith such as a portable camping stove, lantern or the like to enable the fuel tank to be pressurized during operation of the burner assembly without imparting unwanted movement to the tank and without requiring positioning of the hands adjacent the tank and without relocating the tank and associated stove, lantern or the like in an accessible position.

3. A valve for use in association with a pressurized fuel tank having a filler neck and filler cap forming a closure therefor with the filler cap having an opening therethrough, said valve comprising a resilient body having a flange received in the filler cap and an extension extending through the opening in the cap, said body including a small passageway extending therethrough for receiving an inflating needle, the end of the body adapted to be disposed inwardly of the tank including an axial extension in the form of a pair of flaps defining a slit therebetween with the slit being normally closed and being distended and openable by the inflating needle when inserted therethrough thereby enabling the tank to be pressurized by inserting the inflating needle through the valve body.

4. The structure as defined in claim 3 wherein said valve body is of unitary construction with the flange thereon adapted to be positioned between the filler neck and the cap for sealing the same.

5. In combination, a liquid receiving tank having a filler neck, a filler cap forming a closure for the neck, pump means independent of the tank, a flexible hose extending from the pump means to the filler cap, said flexible hose including an inflating needle on the end thereof, said filler cap including a valve body of resilient material having a passageway therethrough enabling ready insertion of the inflating needle to communicate the pump means with the interior of the tank when the inflating needle is inserted through the valve body, the passageway in the valve body being self-sealing when the inflating needle is withdrawn thereby enabling the tank to be pressurized by operating the remote pump means without the tank being moved due to forces exerted on the pump means during operation thereof, said valve body extending into the filler neck and including a flange received in the filler cap and forming a seal between the filler cap and the outer end of the filler neck, the inner end of said body including flaps thereon defining a slit therebetween with the slit being normally closed and penetrable by the inflating needle when the inflating needle is forced through the valve body whereby the needle will communicate with the interior of the tank, said filler cap including a hole therethrough exposing the outer end of the valve body and the passageway thereby enabling the needle to be forced through the passageway, said valve body including an axial extension on the outer end thereof extending into the hole in the filler cap, said flaps being defined by axial extensions on the inner end of the body.

* * * * *